US012643406B2

(12) United States Patent
Meyer et al.

(10) Patent No.: US 12,643,406 B2
(45) Date of Patent: Jun. 2, 2026

(54) SYSTEM AND METHOD FOR FUEL CELL OPERATION MODE SELECTION DURING POWER DEMAND EVENTS

(71) Applicant: FORD GLOBAL TECHNOLOGIES, LLC, Dearborn, MI (US)

(72) Inventors: Jason Meyer, Canton, MI (US); Rajit Johri, San Francisco, CA (US); Stanley L Bower, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 658 days.

(21) Appl. No.: 18/111,273

(22) Filed: Feb. 17, 2023

(65) Prior Publication Data

US 2023/0264572 A1 Aug. 24, 2023

Related U.S. Application Data

(60) Provisional application No. 63/312,269, filed on Feb. 21, 2022.

(51) Int. Cl.
| | |
|---|---|
| *B60L 3/04* | (2006.01) |
| *B60L 50/75* | (2019.01) |
| *B60L 58/40* | (2019.01) |
| *H01M 8/04228* | (2016.01) |
| *H01M 8/04858* | (2016.01) |
| *H01M 8/10* | (2016.01) |

(52) U.S. Cl.
CPC ............... *B60L 3/04* (2013.01); *B60L 50/75* (2019.02); *B60L 58/40* (2019.02); *H01M 8/04228* (2016.02); *H01M 8/04925* (2013.01); *H01M 2008/1095* (2013.01); *H01M 2250/20* (2013.01)

(58) Field of Classification Search
CPC .. B60L 3/04; B60L 50/75; B60L 58/40; B60L 7/10; B60L 2240/423; B60L 2260/26; H01M 2008/1095; H01M 2250/20; H01M 16/006; Y02E 60/50; Y02T 90/40
See application file for complete search history.

(56) References Cited

U.S. PATENT DOCUMENTS

| | | | |
|---|---|---|---|
| 6,488,345 B1 | 12/2002 | Woody et al. | |
| 7,028,795 B2 | 4/2006 | Tabata | |
| 10,150,371 B2 | 12/2018 | Zenner et al. | |
| 2009/0325004 A1* | 12/2009 | Choi ................ | H01M 8/04925 |
| | | | 429/431 |
| 2010/0089672 A1* | 4/2010 | Lee ........................... | B60L 7/16 |
| | | | 180/65.21 |
| 2020/0391615 A1 | 12/2020 | Beck et al. | |

FOREIGN PATENT DOCUMENTS

JP 4685846 B2 5/2011

* cited by examiner

*Primary Examiner* — Adam A Arciero
(74) *Attorney, Agent, or Firm* — David B. Kelley; Brooks Kushman P.C.

(57) ABSTRACT

In at least one embodiment, a vehicle system including a fuel cell stack and a least one controller. The fuel cell stack configured to provide energy for a vehicle. The at least one controller is programmed to control the fuel cell stack to enter into a zero gross power (ZGP) mode responsive to at least the vehicle exhibiting a negative torque demand for a period that is less than a maximum time duration. The at least one controller is further programmed to control the fuel cell stack to enter into a fuel cell shutdown mode responsive to the at least the vehicle exhibiting a negative torque demand for a period that is greater than maximum time duration.

9 Claims, 2 Drawing Sheets

SYSTEM AND METHOD FOR FUEL CELL OPERATION MODE SELECTION DURING POWER DEMAND EVENTS

CROSS-REFERENCE TO RELATED APPLICATIONS

This application claims the benefit of U.S. provisional application Ser. No. 63/312,269 filed Feb. 21, 2022, the disclosure of which is hereby incorporated in its entirety by reference herein.

TECHNICAL FIELD

Aspects disclosed herein generally relate to a system and a method for fuel cell operation during power demand events. In one example, the disclosed system and method may be applied to fuel cell-based vehicles. These aspects and others will be discussed in more detail below.

BACKGROUND

An internal combustion engine can produce zero net torque or event slightly negative torque indefinitely by retarding spark timing. Due to potential fuel cell durability issues, the minimum amount of power that a fuel cell can indefinitely produce in a running state is positive and finite (e.g., 10 kW). When power from the fuel cell (or fuel cell stack) is no longer required or necessary, or there are not any sinks (e.g., vehicle battery or batteries) available to accept power from the fuel cell, then the fuel cell may enter into a temporary "zero gross power mode" or the fuel cell may be shut down at a longer period than that required when the fuel cell is in the zero gross power mode.

In the temporary zero gross power mode, voltage of the fuel cell stack decreases, and the fuel cell is required to be restarted within one to two minutes to prevent fuel cell damage. The system or vehicle may rapidly exit this mode and begin producing power when power demands on the vehicle are detected. When the fuel cell remains in a shutdown state indefinitely, the system initiates and executes a startup process before the fuel cell can begin producing power. The startup process can take up to a few seconds which may not be optimal under certain vehicle operating conditions.

SUMMARY

In at least one embodiment, a vehicle system including a fuel cell stack and a least one controller. The fuel cell stack configured to provide energy for a vehicle. The at least one controller is programmed to control the fuel cell stack to enter into a zero gross power (ZGP) mode responsive to at least the vehicle exhibiting a negative torque demand for a period that is less than a maximum time duration. The at least one controller is further programmed to control the fuel cell stack to enter into a fuel cell shutdown mode responsive to the at least the vehicle exhibiting a negative torque demand for a period that is greater than maximum time duration.

In at least one embodiment, a method for selecting an operating mode for a fuel cell. The method including providing energy via a fuel cell stack for a vehicle and controlling, via at least one controller, the fuel cell stack to enter into a zero gross power (ZGP) mode responsive to at least the vehicle exhibiting a negative torque demand for a period that is less than a maximum time duration. The method further including controlling the fuel cell stack to enter into a fuel cell shutdown mode responsive to the at least the vehicle exhibiting a negative torque demand for a period that is greater than maximum time duration.

In at least another embodiment, a computer-program product embodied in a non-transitory computer read-able medium that is executable by one or more controllers for selecting a mode for a fuel cell is provided. The computer-program product comprising instructions for providing energy via the fuel cell for storage on at least one battery on a vehicle and controlling the fuel cell to enter into a zero gross power (ZGP) mode responsive to at least the vehicle exhibiting a negative torque demand for a period that is less than a maximum time duration. The computer-program product also includes instructions for controlling the fuel cell to enter into a fuel cell shutdown mode responsive to the at least the vehicle exhibiting a negative torque demand for a period that is greater than maximum time duration.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
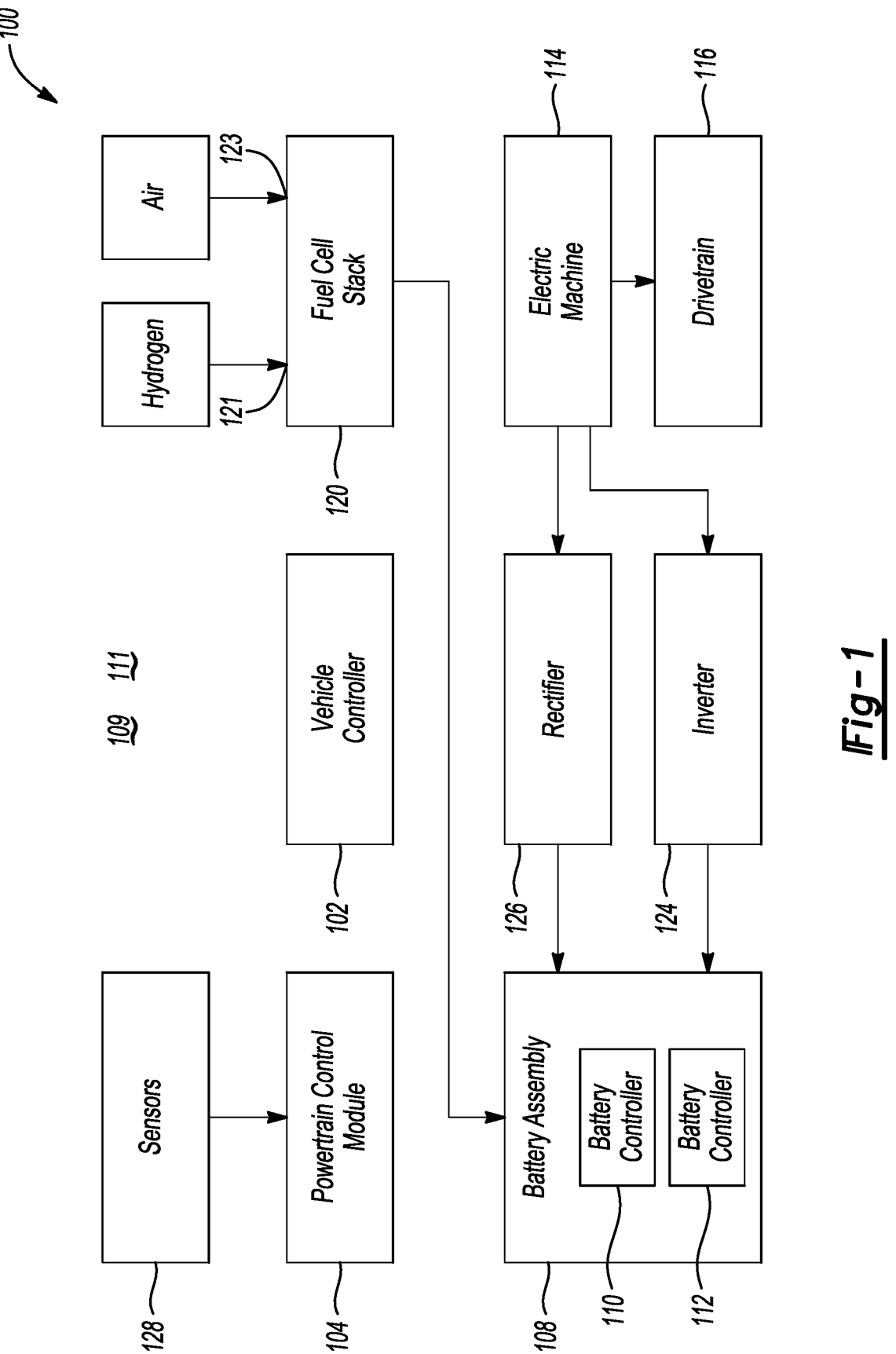
FIG. 1 depicts a system for controlling fuel cell mode operation based on at least one power demand in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

For conditions in which a fuel cell is not required to power a vehicle system or the vehicle system cannot otherwise handle power from the fuel cell, the disclosed system determines which mode to place the fuel cell stack in. For example, the vehicle system may place the fuel cell stack in a fuel cell shutdown mode or in a zero gross power (ZGP) mode. If the system commands the fuel cell (or fuel cell stack) to enter into the fuel cell shutdown mode and driver demand power significantly increases, the system may have to restart the fuel cell before power from the fuel cell can be used to support engine propulsion. This can result in an undesirable hesitation.

If the system commands the fuel cell to enter into the ZGP mode a total power demand remains low for an extended period of time, the fuel cell may have to eventually exit the ZGP mode and operate in a normal running state for a period of time (e.g., a few seconds) before then performing controller the fuel cell to enter into the fuel cell shutdown mode. It is recognized that the vehicle system requires an architecture for distinguishing between long and short low power demand conditions. For short duration events, the system may control the fuel cell to enter into the ZGP mode. For longer durations (e.g., longer durations without power demands), the system may control the fuel cell to enter into the fuel cell shutdown mode.

In general, the vehicle system may not receive or accept power from the fuel cell due to a powertrain power demand being negative (e.g., lift pedal deceleration and/or regenerative braking). The vehicle system may estimate a duration that the vehicle will operate in this type of condition based on vehicle speed and deceleration rate. If the deceleration rate is finite, then the time until this condition has expired is expected to be finite. For example, either the vehicle may become stationary, or a driver may stop requesting negative powertrain torque (i.e., apply an accelerator pedal). If the estimated duration of the condition is smaller than a maximum time duration allocated in the ZGP mode and the system is capable of accepting fuel cell power if driver demand power is zero or positive, then the system commands the fuel cell to enter into the ZGP mode. If the vehicle isn't decelerating (e.g., the vehicle is driving on a downhill grade) or the vehicle is not capable of accepting fuel cell power even if driver demand power was zero, then the system commands the fuel cell to enter into the fuel cell shutdown mode. The disclosed system and method is capable of ensuring that enough energy is captured during a regenerative braking event, ensures battery power limits are maintained, that the powertrain is able to quickly respond to tip-in events, and minimize the number of events that the vehicle has to transition from the ZGP mode to the fuel cell shutdown mode.

FIG. 1 depicts a system 100 for controlling fuel cell mode operation based on at least one power demand in accordance with one embodiment. The system 100 includes at least one vehicle controller 102 (hereafter the controller 102), a powertrain control module 104, a fuel cell stack 106 (or stack 106), and a battery assembly 108. The system 100 may be implemented in a fuel cell based electric vehicle 109 or a fuel cell-based hybrid vehicle 111 (hereafter vehicle 109) or any other such apparatus that uses electrical current to drive various devices.

The battery assembly 108 includes a battery management controller 110 and one or more batteries 112 (hereafter "the battery 112") for powering electrical components in the vehicle 109. The fuel cell stack 106 is configured to generate power for storage on the battery 112. The battery management controller 110 may control the amount of power provided by the fuel cell stack 106 that is stored on the battery 112. An electric machine (or electric motor) 114 may receive power from the battery 112 to drive a drivetrain 116 which propels the vehicle 109. In one example, the fuel cell stack 106 may be a proton exchange membrane fuel cell (PEMFC). The stack 106 includes multiple cells 120, with each cell 120 having an anode side 121 to receive hydrogen, a cathode side 123 to receive air, and a membrane (not shown) positioned therebetween. Each cell 120 may have an anode plate and a cathode plate with channels or other structures formed therein to control the flows of the anode and cathode gases. The stack 106 electrically communicates with and provides energy, for example, the battery assembly 108 via a high voltage (HV) bus. The stack 106 generates stack current in response to electrochemically converting hydrogen from the anode side and oxygen from the cathode side.

Various electrical devices (not shown) may be coupled to the battery 112 to consume such power in order to operate. If the system 100 is used in connection with a vehicle 109, the devices may include a motor and/or a plurality of vehicle electrical components that each consume power to function for a particular purpose. For example, such devices may be associated with and not limited to a vehicle powertrain, cabin heating and cooling, interior/exterior lighting, entertainment devices, and power locking windows in addition to the electric machine 114 as noted above. The particular types of devices implemented in the vehicle 109 may vary based on vehicle content, the type of motor used, and the particular type of fuel cell stack implemented. It is recognized that a low voltage battery (not shown) may be implemented in the vehicle 109 for powering low voltage features such as the cabin heating and cooling, interior/exterior lighting, entertainment device, etc. A DC/DC converter (not shown) may be positioned in the vehicle and step-down high voltage stored on the battery 112 to the low voltage battery.

An inverter 124 is positioned between the battery assembly 108 and the electric machine 114 to invert DC current from the battery 112 into an alternating current (AC) to drive the electric machine 114 which powers the drivetrain 116. In addition, a rectifier 126 is positioned between the electric machine 114 and the battery assembly 108 to convert AC energy received from the drivetrain 116 into DC energy when the vehicle 109 undergoes a braking operation (e.g., regenerative braking).

The powertrain control module (PCM) 104 may be operably coupled to the controller 102 and control operations for the electric machine 114. A plurality of sensors 128 are operably coupled to the PCM 104. Such sensors 128 may comprise vehicle speed sensors, a brake pedal sensor, an accelerator pedal, etc. The sensors 128 provide data indicative of vehicle speed, brake pedal status, and accelerator pedal position to the PCM 104. It is recognized that the vehicle controller 102, the PCM 104, and the battery management controller 110 may communicate with one another via a data communication bus. The data communication bus may be implemented as a High/Medium Speed Controller Area Network (CAN) bus or a Local Interconnect Network (LIN). The particular type of communication bus used may be varied to meet the desired criteria of a particular implementation.

The PCM 104 monitors data from the sensors 128 to assess, among other things, braking status, driver torque demand, and vehicle speed. For example, the PCM 104 receives data from the brake pedal sensor to whether the brake pedal is being applied which indicates braking status. In addition, the PCM 104 received data from the accelerator pedal which is indicative of torque demand. If the driver applies pressure to the accelerator pedal, this operation may be indicative of requested torque demand by the driver. If no pressure is applied to the accelerator pedal, this indicates that no torque demand is being requested by the driver. The PCM 104 receives data from vehicle speed sensors which indicate the speed at which the vehicle is traveling.

The PCM 104 transmits data over the data communication bus to the controller 102. In turn, the controller 102 may control various operational modes for the fuel cell stack 106 based on the data. For example, the controller 102 may control the fuel cell stack 106 to operate in a fuel cell shutdown mode or in a zero gross power (ZGP) mode. It is recognized that the operation of controlling the fuel cell stack 106 to operation in the fuel cell shutdown mode or in the ZGP mode may also be performed by the battery management controller 110 instead of the controller 102. The particular controller(s) that control the fuel cell stack 106 to operate in various modes may vary based on the desired criteria of a particular implementation. In both the fuel cell shutdown mode and the ZGP mode, it is desirable to disable the fuel cell stack 106 to preserve the supply of hydrogen supply based on operating features of the vehicle 109. It is recognized that it may be preferable to deactivate the fuel cell stack 106 in generating energy for additional reasons as well.

In moments where it is unnecessary for the fuel cell stack 106 to generate power for a long period of time, the controller 102 may control the fuel cell stack 106 to enter into the fuel cell shutdown mode. In the fuel cell shutdown mode, the fuel cell stack 106 may be in a shutdown state indefinitely. However, the fuel cell stack 106 is generally required to go through a startup process before the fuel cell stack 106 may resume in generating energy for the vehicle 109. The startup process may take up, for example, a few seconds. In moments where it is unnecessary for the fuel cell stack 106 to generate power for a short period of time, the controller 102 may control the fuel cell stack 106 to enter into the ZGP mode. In ZGP mode, the fuel cell stack 106 does not provide energy or voltage for a time period that does not exceed a predetermined amount of time (e.g., one to two minutes). While in the ZGP mode, the fuel cell stack 106 is required to be started upon expiration of the predetermined amount of time to prevent the fuel cell stack 106 from being damaged. In addition, the fuel cell stack 106 may exit from the ZGP mode quickly to resume producing power for the vehicle 109. Thus, in this regard, it is desirable to understand various operating conditions for the vehicle 109 to determine when the fuel cell stack 106 should be placed in the fuel cell shutdown mode or in the ZGP mode. Given that the fuel cell stack 106 needs to be restarted at a point in time that does not exceed the predetermined amount of time, it is desirable for the vehicle 109 to place the fuel cell stack 106 in the ZGP mode when the vehicle 109 determines that fuel cell stack 106 is not required to be active for a period of time that doesn't exceed the predetermined amount of time. When the vehicle 109 determines that the fuel cell stack 106 can be disabled for a period of time that exceeds the predetermined amount of time, it is desirable in this case to control the fuel cell stack 106 to enter into the fuel cell shutdown mode.

In general, the system 100 is configured to distinguishing between long and short low power demand conditions for the vehicle 109. For short duration low power demand events, the system 100 may control the fuel cell stack 106 to enter into the ZGP mode. For longer durations low power demand events, the system 100 may control the fuel cell stack 106 to enter into the fuel cell shutdown mode.

Figure 2:
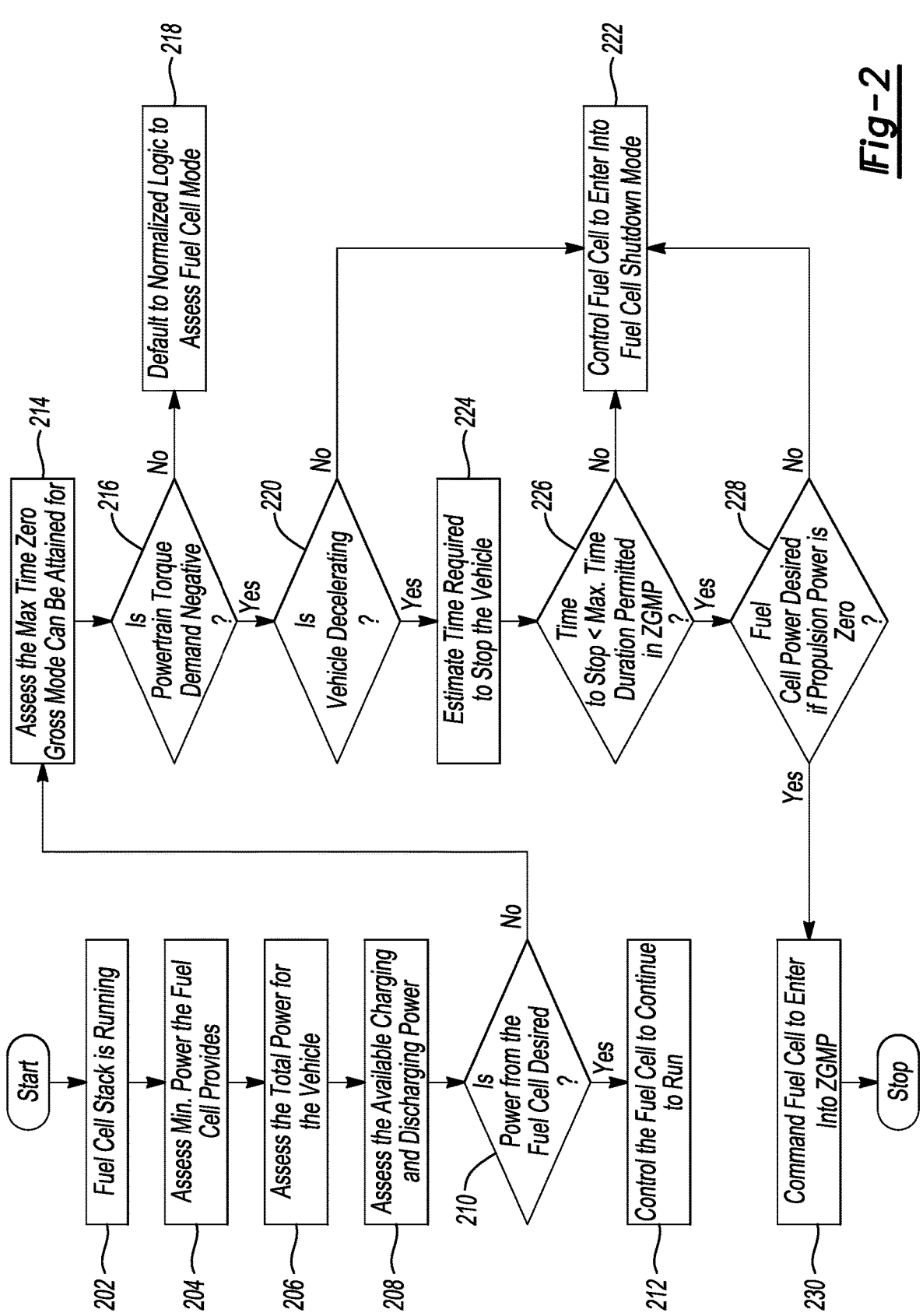
FIG. 2 depicts a method for controlling fuel cell mode operation based on at least one power demand in accordance with one embodiment.

FIG. 2 depict a method 200 for controlling fuel cell mode operation based on at least one power demand in accordance with one embodiment.

In operation 202, the controller 102 activates the fuel cell stack 106 to generate energy (or power) for the vehicle 109. In this regard, the power generated by the fuel cell stack 106 may be stored on the battery 112.

In operation 204, the controller 102 assesses the minimum amount of power that the fuel cell stack 106 is producing. For example, the controller 102 may receive the amount of power that is being produced by the fuel cell stack 106 from the battery management controller 110.

In operation 206, the controller 102 determines the total amount of power that is being demanded by the vehicle 109. For example, the controller 102 may monitor the amount of power that is being requested by the battery management controller 110 and further based on driver demand as indicated by data received by the sensors 128 (e.g., torque demand based on accelerator position sensor, etc.).

In operation 208, the controller 102 determines the available battery charging power and the discharging power. In one example, the controller 102 may receive information as to the amount of battery charging power is left on the battery 112 and also the rate of power being discharged by the battery 112 from the battery management controller 110.

In operation 210, the controller 102 determines if any devices or subsystems are requiring power from the fuel cell stack 106. In any devices or subsystems are requiring power from the fuel cell stack 106, the method 200 moves to operation 212. If not, then the method 200 moves to operation 214.

In operation 212, the controller 102 continues to control the fuel cell stack 106 to continue to power the vehicle 109.

In operation 214, the controller 102 accesses a maximum time duration that the ZGP mode can be attained for. For example, the controller 102 accesses a time period that does not exceed the predetermined amount of time (or the maximum time duration) (e.g., one to two minutes) required to prevent the fuel cell stack 106 from be damaged without being restarted. As noted above, while in the ZGP mode, the fuel cell stack 106 is required to be started upon expiration of the maximum time duration to prevent the fuel cell stack 106 from being damaged.

In operation 216, the controller 102 determines whether the torque demand for the vehicle 109 is negative. Various example of the vehicle 109 having a negative torque demand may include the vehicle 109 undergoing a regenerative braking whereby the electric motor 114 provide energy back to the battery 112 or when the vehicle 109 undergoes a deceleration event (e.g., lift pedal deceleration). If the controller 102 determines that the torque demand is not negative, then the method 200 proceeds to operation 218. If the controller 102 determines that the torque demand is negative, then the method 200 move to operation 220.

In operation 218, the controller 102 continues to assess the fuel cell mode and moves back to operation 202. In operation 220, the controller 102 determines whether the vehicle 109 is decelerating (e.g., brake switch is applied and/or vehicle speed is monitored). If this condition is not true, then the method 200 moves to operation 222. If the vehicle 109 is still decelerating, then the method 200 moves to operation 224.

In operation 222, the controller 102 controls the fuel cell stack 106 to enter into the fuel cell shutdown mode. In operation 224, the controller 102 estimates the time required for the vehicle 109 to come to a stop. In operation 226, the controller 102 determines whether the overall time for the vehicle 109 to come to a stop is less than the maximum time duration (e.g., one to two minutes) associated with the ZGP mode. As noted above, the fuel cell stack 106 is required to be restarted at some point in time prior to the expiration of the maximum time duration while in the ZGP mode to prevent the fuel cell stack 106 from being damaged. If the vehicle 109 is determined to come to a stop at a time that exceeds the maximum time duration associated with the ZGP mode, then the method 200 moves to operation 228. If the controller 102 determines that the vehicle 109 will come to a stop at a time period that is less than the maximum time duration associated with the ZGP mode, then the method 200 moves to operation 228.

In operation 228, the controller 102 determines if power from the fuel cell stack 106 is required as the propulsion power remains at zero or is negative. It is recognized that the battery 112 may not operate in a torque domain. The common domain may be power. For the motor 114, power is generally defined as torque*speed. For the battery 112, power is generally defined as current*voltage. When driver demand torque is negative, driver power is also negative and this entails that the motor 114 generates power to deliver that torque. Thus, the battery 112 needs to be capable of accepting that power. If this condition in operation 228 is true, then the method 200 moves to operation 222 and the controller 102 controls the fuel cell stack 106 to enter into the fuel cell shutdown mode. If not, then the method 200 moves to operation 230.

In operation 240, the controller 102 controls the fuel cell stack 106 to enter into the ZGP mode and the controller 102 also controls the fuel cell stack 106 to restart before expiration of the maximum time duration to prevent the fuel cell stack 106 from being damaged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a fuel cell stack configured to provide energy for a vehicle; and
at least one controller programmed to:
control the fuel cell stack to enter into a zero gross power (ZGP) mode responsive to the vehicle exhibiting a negative torque demand for a period that is less than a maximum time duration, the vehicle decelerating after exhibiting the negative torque demand, and an overall time in which the vehicle comes to a complete stop being less than the maximum time duration; and
control the fuel cell stack to enter into a fuel cell shutdown mode responsive to the vehicle exhibiting the negative torque demand for a period that is greater than the maximum time duration.

2. The vehicle system of claim 1, wherein the at least one controller is further programmed to control the fuel cell stack to shut down for the period that is greater than the maximum time duration when the fuel cell stack is in the fuel cell shutdown mode.

3. The vehicle system of claim 1, wherein the at least one controller is further programmed to enter into the fuel cell shutdown mode responsive to the vehicle exhibiting the negative torque demand and the vehicle not exhibiting a deceleration event.

4. A method comprising:
providing energy via a fuel cell stack for a vehicle;
controlling, via at least one controller, the fuel cell stack to enter into a zero gross power (ZGP) mode responsive to the vehicle exhibiting a negative torque demand for a period that is less than a maximum time duration;
controlling the fuel cell stack to enter into a fuel cell shutdown mode responsive to the vehicle exhibiting the negative torque demand for a period that is greater than the maximum time duration; and
controlling the fuel cell stack to enter into the fuel cell shutdown mode responsive to the vehicle exhibiting the negative torque demand and the vehicle not exhibiting a deceleration event.

5. The method of claim 4, further comprising controlling the fuel cell stack to shut down for the period that is greater than the maximum time duration when the fuel cell stack is in the fuel cell shutdown mode.

6. The method of claim 4, further comprising controlling the fuel cell stack to enter into the ZGP mode responsive to at least the vehicle decelerating after the vehicle exhibits the negative torque demand.

7. The method of claim 6, further comprising controlling the fuel cell stack to enter into the ZGP mode responsive to an overall time in which the vehicle comes to a complete stop being less than the maximum time duration.

8. A computer-program product embodied in a non-transitory computer read-able medium that is executable by one or more controllers to select a mode for a fuel cell, the computer-program product comprising instructions for:
providing energy via the fuel cell for storage on at least one battery on a vehicle;
controlling, via at least one controller, the fuel cell to enter into a zero gross power (ZGP) mode responsive to the vehicle exhibiting a negative torque demand for a period that is less than a maximum time duration, the vehicle decelerating after exhibiting the negative torque demand, and an overall time in which the vehicle comes to a complete stop being less than the maximum time duration; and
controlling the fuel cell to enter into a fuel cell shutdown mode responsive to the vehicle exhibiting a negative torque demand for a period that is greater than maximum time duration.

9. The computer-program product of claim 8, further including controlling the fuel cell to shut down for the period that is greater than the maximum time duration when the fuel cell is in the fuel cell shutdown mode.

* * * * *